US010915650B2

(12) United States Patent
Dhanabalan et al.

(10) Patent No.: US 10,915,650 B2
(45) Date of Patent: Feb. 9, 2021

(54) SECURELY SHARING FILES WITH USER DEVICES BASED ON LOCATION

(71) Applicant: Citrix Systems, Inc., Fort Lauderdale, FL (US)

(72) Inventors: Praveen Raja Dhanabalan, Bangalore (IN); Saurabh Pant, Bangalore (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 74 days.

(21) Appl. No.: 16/174,499

(22) Filed: Oct. 30, 2018

(65) Prior Publication Data
US 2020/0134219 A1 Apr. 30, 2020

(51) Int. Cl.
*H04L 29/06* (2006.01)
*G06F 21/62* (2013.01)
*G06F 16/176* (2019.01)
*H04L 29/08* (2006.01)
*H04W 12/06* (2021.01)

(52) U.S. Cl.
CPC ........ *G06F 21/6218* (2013.01); *G06F 16/176* (2019.01); *H04L 63/0853* (2013.01); *H04L 63/0876* (2013.01); *H04L 63/107* (2013.01); *H04L 67/06* (2013.01); *H04W 12/06* (2013.01)

(58) Field of Classification Search
CPC ...... G06F 21/6218; G06F 21/10; G06F 21/35; G06F 21/44; G06F 2221/2111; G06F 16/176; H04L 63/08; H04L 63/12; H04L 63/0869; H04L 63/0876; H04L 63/107; H04L 67/06; H04W 12/06
See application file for complete search history.

(56) References Cited

U.S. PATENT DOCUMENTS

| 7,546,299 B2* | 6/2009 | Benco .................. G06F 16/182 |
| 7,822,824 B2* | 10/2010 | Murakami ............ G06F 3/0607 |
| | | 707/781 |
| 8,495,751 B2* | 7/2013 | Joyce ..................... G06F 21/00 |
| | | 726/29 |

(Continued)

OTHER PUBLICATIONS

"The global standard for connection" Bluetooth Technology | Bluetooth Technology Website https://www.bluetooth.com/bluetooth-technology website visited Aug. 27, 2018, 1 page.

(Continued)

*Primary Examiner* — Hosuk Song
(74) *Attorney, Agent, or Firm* — Banner & Witcoff, Ltd.

(57) ABSTRACT

Methods and systems for securely sharing files with user devices based on location are described herein. A computing device may receive, from a user device, a request to share a file. The computing device may determine other user devices at the location of the user device desiring to share a file. Unique tokens and/or unique session identifiers may be generated to facilitate secure sharing of the file, and each token and/or session identifier may correspond to a different user device. The computing device may send, to each different user device, the device's corresponding token and/or session identifier. The computing device may also send, to the user device desiring to share the file, the tokens and/or session identifiers for the other user devices. The user device may securely send the file to one or more of the other user devices using the tokens and/or session identifiers.

20 Claims, 8 Drawing Sheets

(56) References Cited

U.S. PATENT DOCUMENTS

| | | | | |
|---|---|---|---|---|
| 8,725,838 B2* | 5/2014 | Bezos | ................... | H04W 4/21 |
| | | | | 709/218 |
| 8,898,742 B2* | 11/2014 | Joyce | ................... | G06F 21/00 |
| | | | | 726/4 |
| 10,250,671 B2* | 4/2019 | Lee | ................... | H04L 67/104 |
| 2010/0005138 A1* | 1/2010 | Manzano | ................ | H04L 51/00 |
| | | | | 709/203 |
| 2017/0177609 A1* | 6/2017 | North | ................. | G06F 21/6209 |

OTHER PUBLICATIONS

"Citrix ShareFile: Securely Sync, Store and Share Files" Citrix Systems, Inc. https://www.sharefile.com/ website visited, Aug. 27, 2018, pp. 1-8.

"SHAREit—Download" https://shareit.en.softonic.com/ website visited Jul. 23, 2018, pp. 1-4.

"Wi-Fi Direct | Wi-Fi Alliance" https://www.wi-fi.org/discover-wi-fi/wi-fi-direct website visited Aug. 27, 2018, pp. 1-4.

\* cited by examiner

SECURELY SHARING FILES WITH USER DEVICES BASED ON LOCATION

FIELD

Aspects described herein generally relate to computer networking and determining locations of user devices. More specifically, aspects described herein relate to generating, based on locations of user devices, unique tokens and/or session identifiers for user devices to securely share files with other user devices.

BACKGROUND

During a meeting, an attendee may wish to share a file with other attendees. For example, the attendee may want to discuss a presentation or a document. In order to share the file, the attendee may have to add permissions for each attendee, which may require the attendee to know or find out the email addresses of the other attendees. In some instances, this overhead may lead to the presenter not sharing the file at all. If the presenter decides to add permissions for attendees, such as by inputting the email addresses of attendees, a sizeable portion of the meeting time might be wasted. For example, in a short 15-minute meeting, spending 5 minutes to share a file may result in wasted time.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards securely sharing files with user devices. In some examples, a system may comprise a server receiving, from a first user device, a request to share a file. The server may determine a plurality of user devices within an area that includes the first user device. Based on receiving the request to share the file, a plurality of identification information may be generated. Each identification information may correspond to a different user device of the plurality of user devices. The server may send, to each user device of the plurality of user devices, the identification information corresponding to the user device. The server may also send, to the first user device, the plurality of identification information to enable the first user device to securely send a file to one or more of the plurality of user devices.

In some examples, determining a plurality of user devices within an area that includes the first user device may comprise determining a plurality of user devices within a threshold distance from the first user device. Methods described herein may comprise receiving location information for the plurality of user devices, and determining a plurality of user devices within an area that includes the first user device may comprise determining a geographical location of the first user device, and based on a comparison of the location information to the geographical location of the first user device, determining the plurality of user devices at the same geographical location as the first user device.

In some examples, the identification information may comprise a plurality of unique tokens and a plurality of unique session identifiers. Generating the plurality of identification information may comprise generating a plurality of unique tokens, and each unique token may correspond to a different user device of the plurality of user devices. Generating the plurality of identification information may also comprise generating a plurality of unique session identifiers, and each unique session identifier may correspond to a different user device of the plurality of user devices. Sending the identification information may comprise sending, to each user device of the plurality of user devices, the unique token and the unique session identifier corresponding to the user device. Sending the plurality of identification information may comprise sending, to the first user device, the plurality of unique tokens and the plurality of unique session identifiers.

In some examples, the server may receive, from the first user device, the file to be shared. The server may store the file to be shared. The server may send, to a user device at a location remote from the area that includes the first user device, the stored file.

In some examples, the server may receive, from a user device at a geographical location different from the area that includes the first user device, a request for the file. The server may send, to the user device at the geographical location different from the area that includes the first user device, the file.

In some examples, before sending the identification information to each user device of the plurality of user devices, the server may authenticate the plurality of user devices. Based on the authenticating, methods described herein may comprise generating, for each user device of the plurality of user devices, a secured channel between the server and the user device. Sending the plurality of identification information to the first user device may comprise sending, to the first user device and via the secured channel between the server and the first user device, the plurality of identification information.

In some examples, the first user device may send, to a server, a request to share a file. Based on sending the request to share the file, the first user device may receive, from the server, a plurality of identification information, and each identification information may correspond to a different user device of a plurality of user devices. The first user device may send, to a plurality of user devices in proximity of the first user device, identification information requests. Based on sending the identification information requests, the first user device may receive, from one or more user devices in proximity of the first user device, one or more identification information. Based on receiving the one or more identification information, the first user device may send, to the one or more user devices in proximity of the first user device, the file.

In some examples, the first user device may compare the one or more identification information to the plurality of identification information received from the server. Based on the comparing, the first user device may validate the one or more user devices in proximity of the first user device. Sending the file may be based on the validating.

In some examples, sending the identification information requests may comprise sending the identification information requests via direct connections between the first user device and the plurality of user devices in proximity of the first user device. The direct connections may comprise one or more of Bluetooth connections or Wi-Fi Direct connections.

In some examples, sending the identification information requests may comprise broadcasting the identification information requests via one or more short-range networks. Additionally or alternatively, receiving the one or more identification information may comprise receiving the one or more identification information via one or more short-range networks.

In some examples, the identification information may comprise a plurality of unique tokens and a plurality of unique session identifiers. Receiving the plurality of identification information may comprise receiving, by the first user device, from the server, and via a secured channel between the server and the first user device, the plurality of unique tokens and the plurality of unique session identifiers. Each unique token may correspond to a different user device of the plurality of user devices, and each unique session identifier may correspond to a different user device of the plurality of user devices. Methods described herein may comprise encrypting, for each user device of the one or more user devices in proximity of the first user device, the file with a unique session identifier corresponding to the user device. Sending the file may comprise sending, for each user device of the one or more user devices in proximity of the first user device, the file encrypted with the unique session identifier corresponding to the user device.

In some examples, based on a determination to share the file with one or more remote user devices, the first user device may send, to the server, the file.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards securely sharing files with user devices based on location. For example, a computing device may receive, from a user device, a request to share a file. The computing device may determine a plurality of other user devices at the location of the user device. The computing device may generate a plurality of unique tokens and/or a plurality of unique session identifiers, and each unique token and/or unique session identifier may correspond to a different user device. The computing device may send, to each user device, its corresponding unique token and/or session identifier. The computing device may also send, to the user device desiring to share the file, the unique tokens and/or session identifiers for the other user devices. The user device may securely send the file to one or more of the other user devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
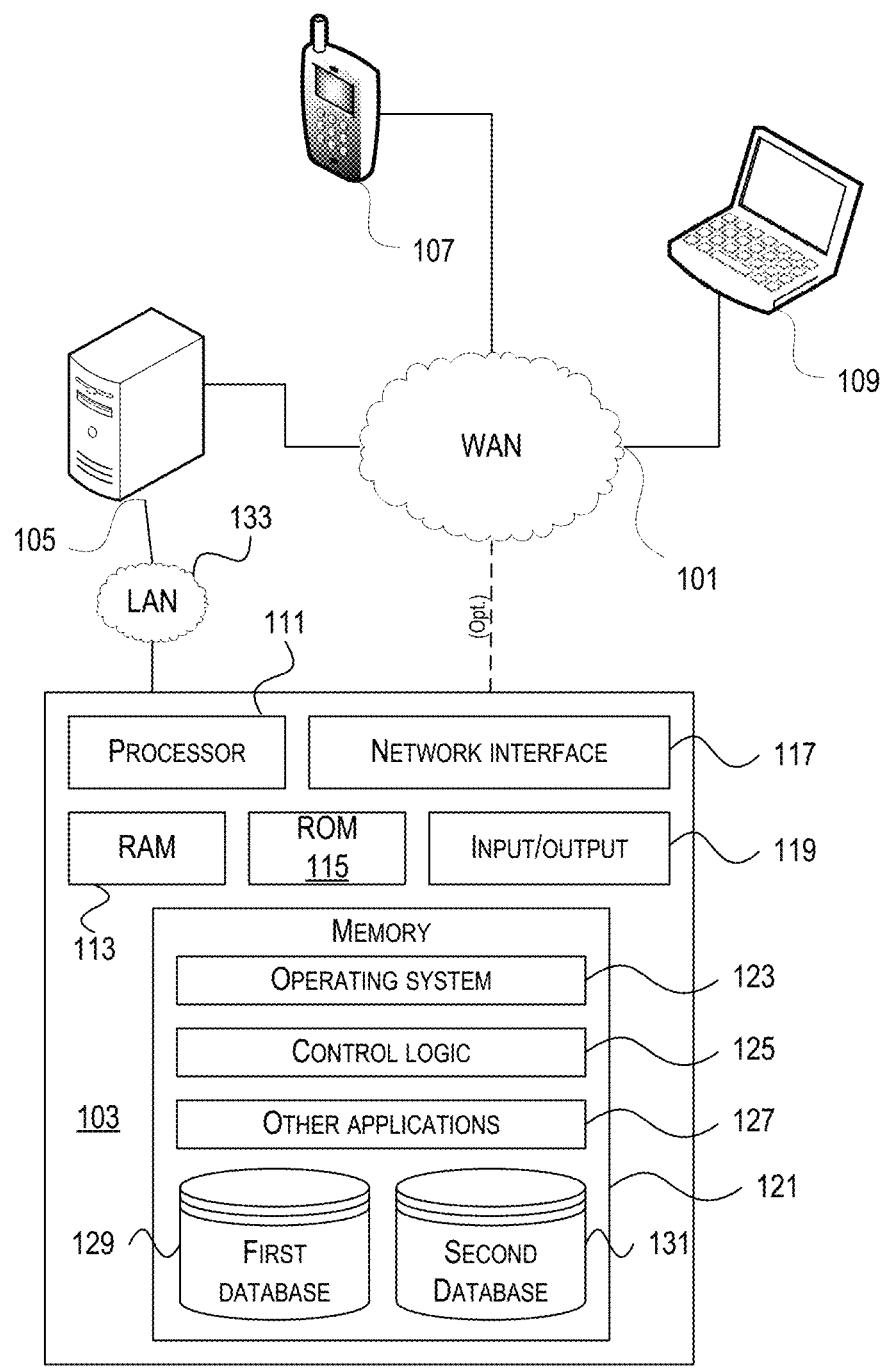
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
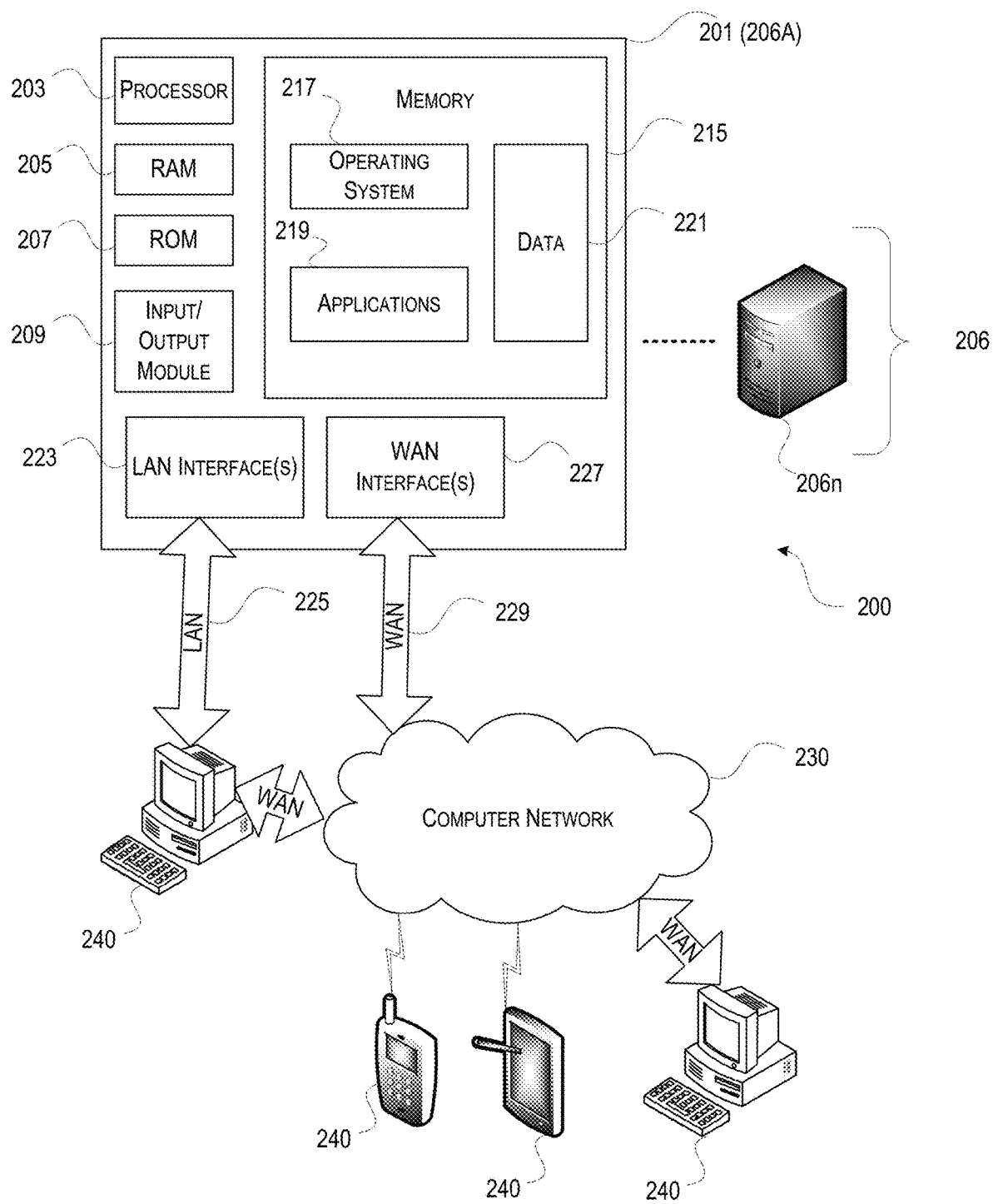
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206*b* (not shown), and responds to the request generated by the client machine 240 with a response from the second server 206*b* (not shown.) First server 206*a* may acquire an enumeration of applications available to the client machine 240 as well as address information associated with an application server 206 hosting an application identified within the enumeration of applications. First server 206*a* can then present a response to the client's request using a web interface, and communicate directly with the client 240 to provide the client 240 with access to an identified application. One or more clients 240 and/or one or more servers 206 may transmit data over network 230, e.g., network 101.

Figure 3:
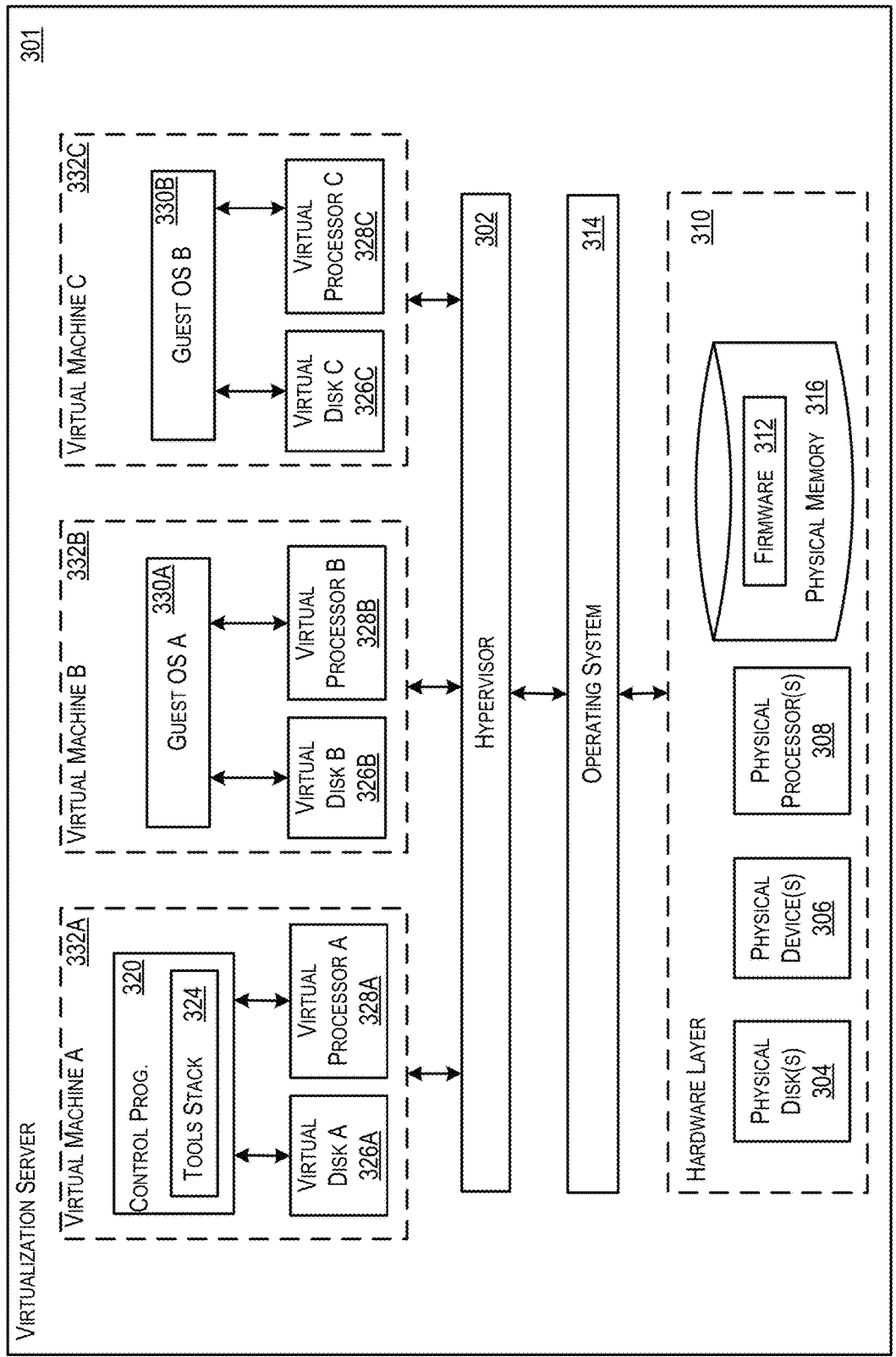
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
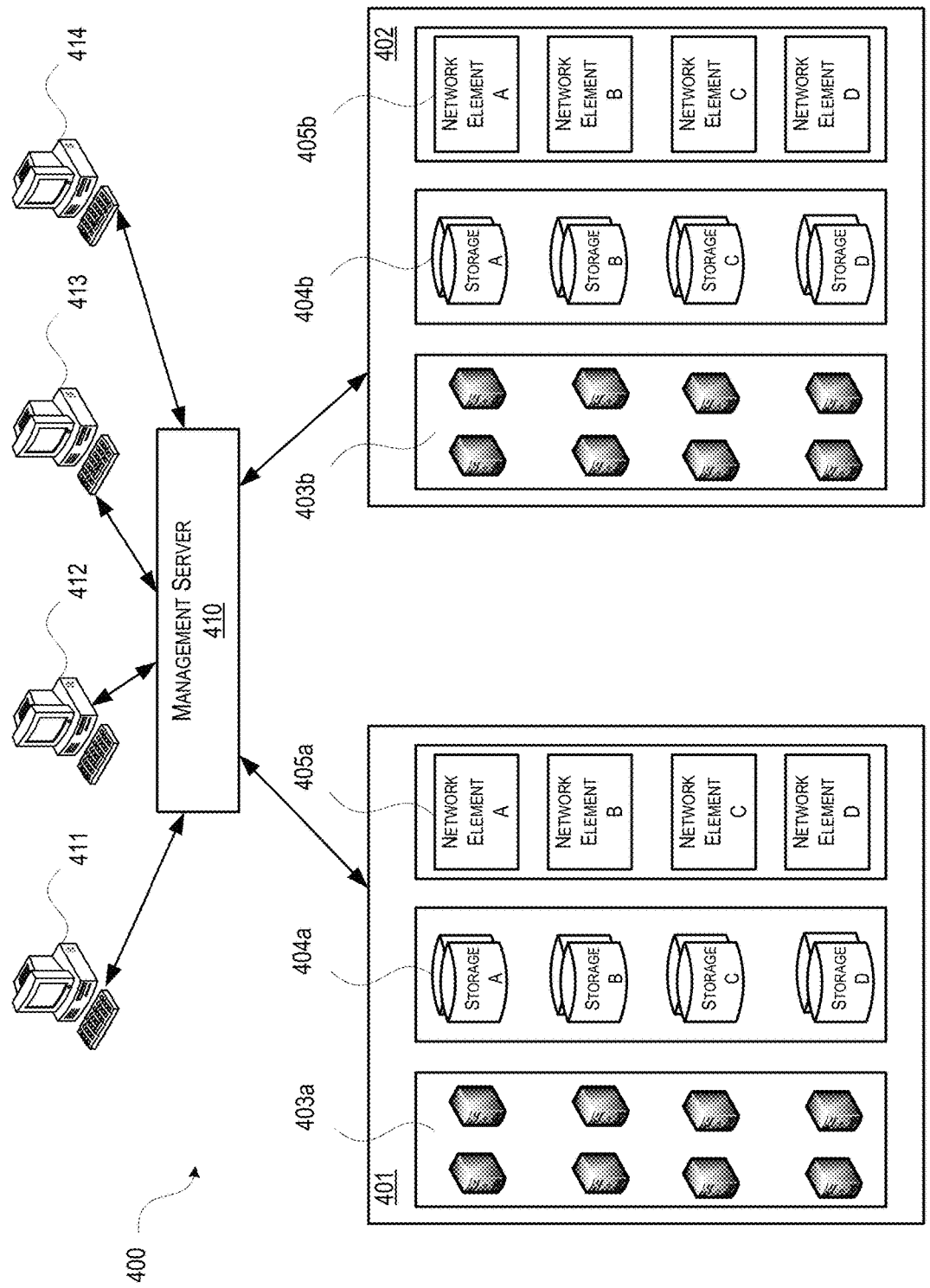
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Wash.), IBM BLUE CLOUD (IBM Corporation of Armonk, N.Y.), or others.

Securely Sharing Files with User Devices Based on Location

Aspects described herein allow content to be quickly and securely shared with multiple user devices, such as for instant local meetings. For example, content may be shared with user devices based on one or more of geographic location and/or short-range ad-hoc networks (e.g., Bluetooth, Wi-Fi Direct, etc.). As will be described in further detail below, a computing device may send identification information (e.g., secure tokens and/or session identifiers) to user devices via a centralized cloud service. Sending the secure tokens and/or session identifiers may be based on identified geographic locations of, for example, a small group of users. The user devices receiving the tokens and/or session identifiers may have previously authenticated with the computing device, which may provide an extra layer of security for the file(s) being shared with one or more of those devices. Moreover, by sending tokens and/or session identifiers to a group of user devices within a smaller geographic area, fewer computer and network resources may be used to generate the tokens and/or session identifiers and to send the file to user devices. A device desiring to share content may receive a copy of the tokens and/or session identifiers for the other user devices. The sending device may securely validate the tokens of other user devices, such as by broadcasting a request for token via a short-range network. After validation, the sending device may securely transfer the content by, for example, encrypting the content using the session identifier for the respective device receiving the content. In some examples, the sending device may be using an enterprise solution for secure file synchronization and sharing.

FIGS. 5A-D illustrate an example method for sharing files with other user devices in accordance with one or more illustrative aspects described herein. A plurality of users and their respective devices may be at the same geographical location, such as a meeting room, adjacent meeting rooms, the same building, etc. During a meeting, a first device (e.g., a sending device) may desire to share a file with one or more other devices, which may also be at the meeting. The first device and/or the other devices may comprise, for example, desktop computers, mobile phones, laptop computers, tablet computers, etc., as previously described. In step 502, the first device may send, to a computing device, a file and/or a request to share the file. The computing device may be a server, such as the server 206 and/or the data server 103 described above. The computing device may be used to authenticate user devices, generate tokens and/or session identifiers for user devices, and/or store files to be shared with user device, as will be described in further detail below.

In some scenarios, the first device may send the file to the computing device so that the file may be shared with user devices at locations remote from the location of the first device (e.g., for remote attendees of a meeting). In some scenarios, the first device might not send the file to the computing device, such as if there are no remote attendees or the first device does not plan to send the file to remote attendees. An indication of the file to be shared may be displayed to the user via the first device or another device associated with the user. The user may initiate a file sharing request, such as by selecting a button (e.g., virtual or physical button) next to or otherwise associated with the indication of the file to be shared. This may allow the user to share the file within a meeting room for a local group, for example.

In step 504, a computing device may receive, from the first device, the file and/or the request to share the file. In some examples, the computing device may run on a cloud network as a cloud service. The cloud network may comprise or facilitate communications between multiple servers and give user devices access to computing resources, such as storage resources and/or processing resources for generating unique tokens and/or session identifiers. The cloud service may run on one of the servers or on a plurality of servers. The cloud service may comprise a trusted global entity, and the cloud service may facilitate secure sharing of files between different users. For example, users may view and/or modify the same files via the cloud service. The trusted global entity may provide enterprise-level security for connecting user devices and may be trusted by those user devices, which may be at the same location or at different locations. Before other devices can access files from the computing device and/or directly from the first device, the other devices may have logged on or otherwise authenticated with the computing device or other cloud service. For example, a user of the user device may have provided a username and password, biometrics, and/or other credentials to authenticate with the computing device. Based on the authentication, the user device may be associated with a particular secured domain, and devices associated with the same secured domain may be able to share files with each other.

In step 506, the computing device may store the file to be shared. As previously explained, the first device may send the file to be shared if the file is to be made available to devices at remote locations, such as devices used by remote attendees of a meeting. Receiving the actual file to share and receiving the request to share the file locally may be performed in parallel, such that devices within proximity of the first device and devices remote from the first device may be able to access the same file.

In step 508, the computing device may determine the location of the first device. In some examples, the first device may detect its location based on location services, Global Positioning System (GPS) signals, Bluetooth beacons, other wireless signals, an IP address of the first device, etc. The first device may send its location to the computing device. Additionally or alternatively, the computing device itself may determine the location of the first device. For example, the user may have scheduled a meeting or accepted an invitation to a meeting, and location information for the meeting may have been stored on an electronic calendar associated with the user. The computing device may access the electronic calendar to determine the location of the first device associated with the user, such as a particular meeting room, a particular area in a building, etc.

In step 510, the computing device may determine one or more other devices based on the location of the first device. As previously explained, the other devices may have authenticated with the computing device and be associated with a particular secured domain, such as a secured domain that the first device is part of. The computing device may identify other devices that are in the same geographical location as the first device, such as within 50 meters of the first device, within the same conference room, within the same area in a building, within a group of adjacent meeting rooms, etc. As previously explained, the location of the other devices may be based on location services, GPS signals, etc. In some examples, the computing device may request, from the other device, its location. Additionally or alternatively, the other device may regularly, continuously, or sporadically send its location to the computing device, so that the location of the device may be kept up to date. By determining other device(s) near the first device, the computing device may identify a smaller subset of user devices that may potentially be in the same local meeting as the first device. For example, the computing device may quickly identify the local group to share files, without having to determine the other devices' information upfront (e.g., e-mail address, user ID, etc.).

In step 512, the computing device may generate one or more unique tokens for the other devices determined in step 510. The computing device may generate a token for each device, and the tokens may be different from each other. Unique tokens may comprise, for example, random or pseudorandom numbers, letters, and/or other characters. In step 514, the computing device may generate one or more unique session identifiers for the other devices determined in step 510. The computing device may generate a session identifier for each other device, and the session identifiers may be different from each other. Unique session identifiers may comprise, for example, random or pseudorandom numbers, letters, and/or other characters. The computing device may associate a device's token with the device's session identifier. For example, the following may comprise a token and a session identifier for one of the devices determined in step 510 (e.g., a receiving device R1):

| Token | Session |
|---|---|
| saa#@%@#asdfs12d | !s3sdf#%s!12s$sf |

As another example, the following may comprise a token and a session identifier for another of the devices determined in step 510 (e.g., a receiving device R2):

| Token | Session |
|---|---|
| Asdf2323@#$!@#%$ | 12A@#!@AW!@q |

Figure 5A:
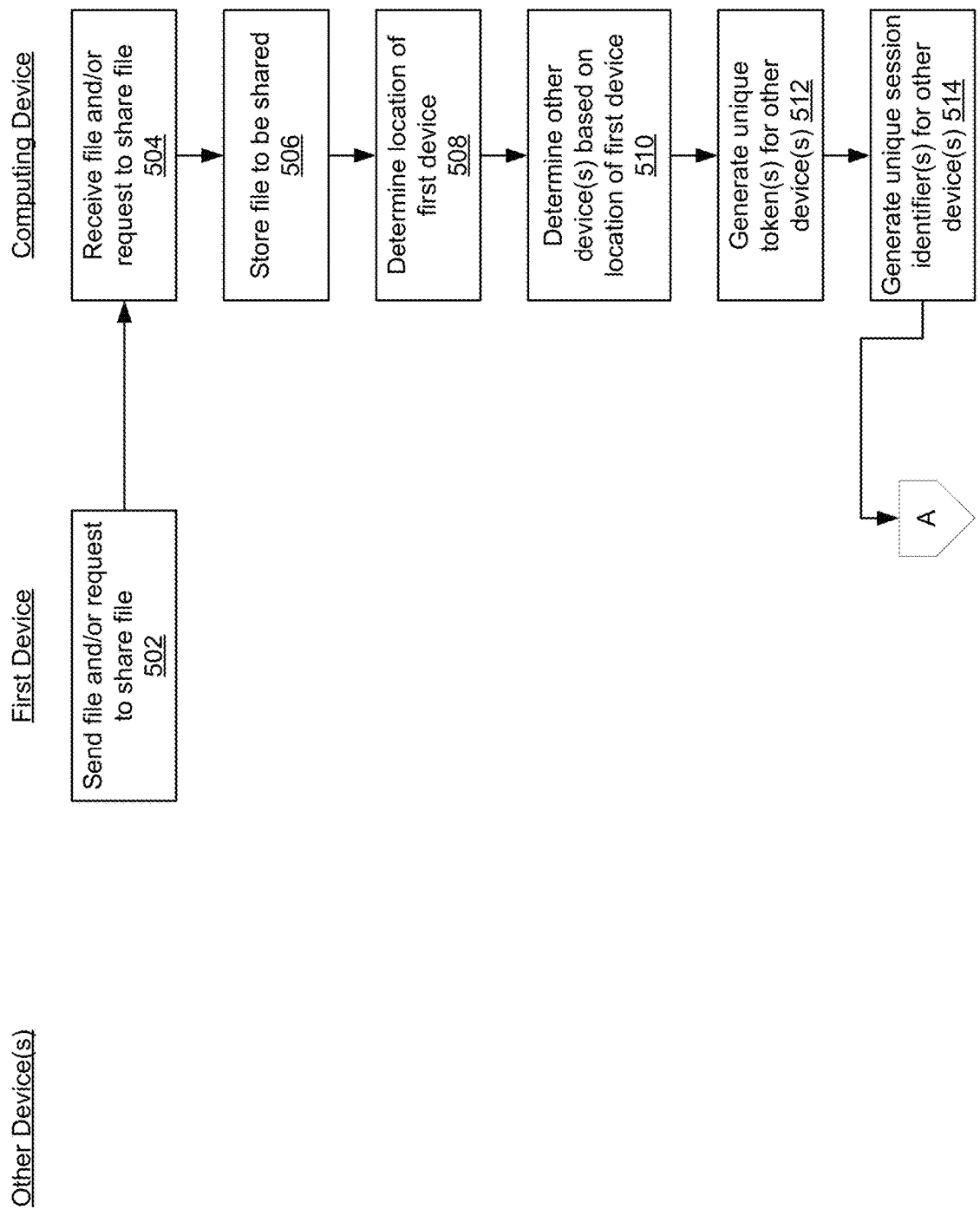
FIGS. 5A-D illustrate an example method for sharing files with other user devices in accordance with one or more illustrative aspects described herein.
Figure 5B:
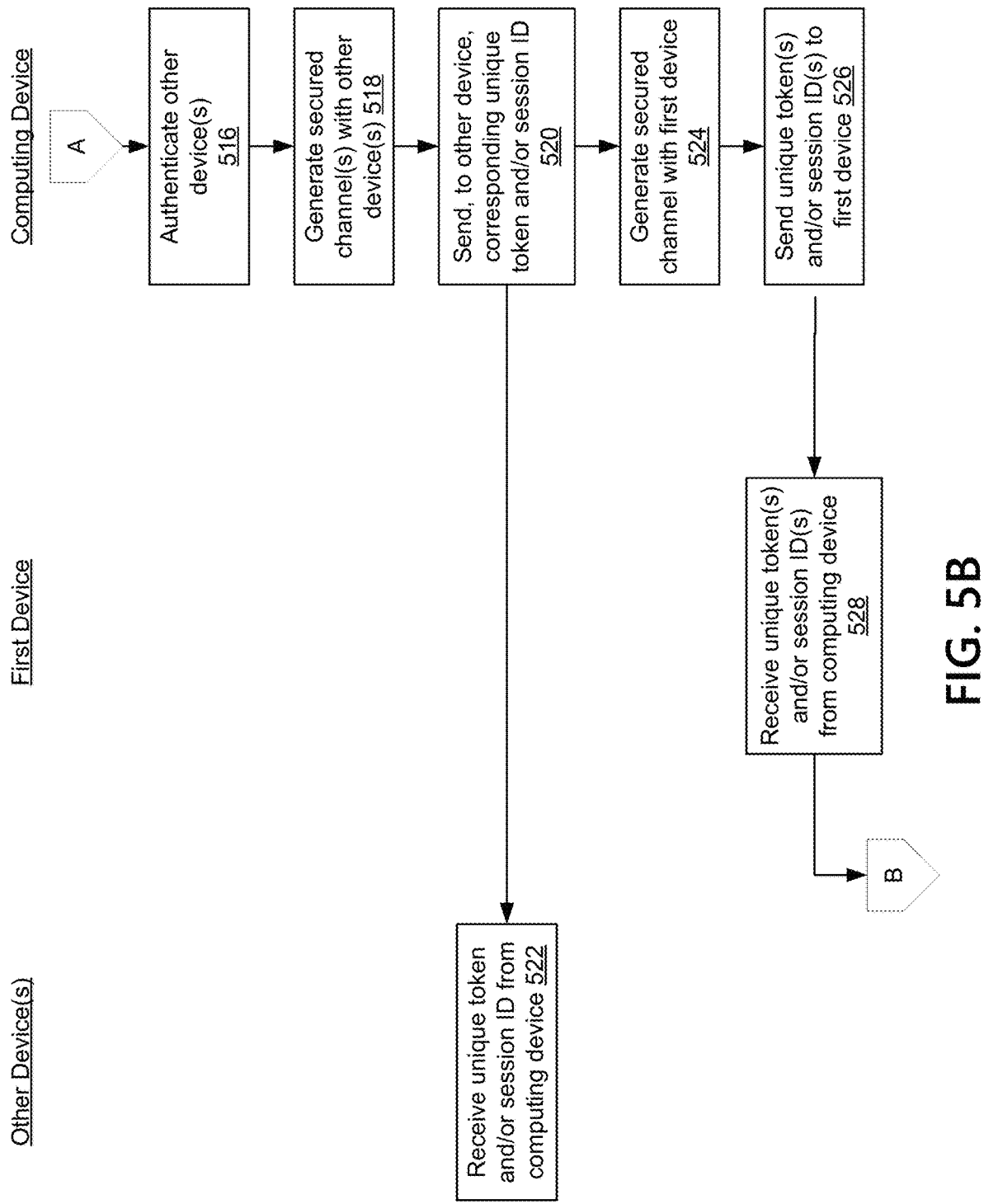

The computing device may similarly generate unique tokens and/or session identifiers for other devices determined in step 510. As shown above, the computing device may generate a mapping by map each receiving device to its corresponding token and/or session identifier. With reference to FIG. 5B, in step 516, the computing device may authenticate the other devices. Authentication of the other devices may be performed at any time. For example, and as previously explained, the other devices may be authenticated when they log in or otherwise attempt to authenticate with the computing device to join the secured domain associated with the first device. The other devices may be authenticated before any tokens and/or session identifiers are sent to those other devices.

In step 518, the computing device may generate one or more secured channels with the other devices. The secured channels may comprise authenticated sessions between the other devices and the computing device, and the secured channels may be generated after the device has authenticated with the computing device.

In step 520, the computing device may send, to the other devices, their corresponding unique token and/or session identifier. For example, the unique token and/or session identifier for a device may be securely shared with a device via the secured channel between the device and the computing device. In step 522, the other device(s) may receive, from the computing device, their respective unique token and/or session identifier. In the above example, a receiving device R1 may receive, from the computing device, the following token and session identifier:

| Token | Session |
|---|---|
| saa#@%@#asdfs12d | !s3sdf#%s!12s$sf |

Similarly, a receiving device R2 may receive, from the computing device, the following token and session identifier:

| Token | Session |
|---|---|
| Asdf2323@#$!@#%$ | 12A@#!@AW!@q |

While the above example describes different devices receiving different tokens, the computing device may send the same token to a plurality of the devices. For example, the token saa#@%@#asdfs12d may be used for both the receiving device R1 and the receiving device R2. In step 524, the computing device may generate a secured channel with the first device (e.g., the device desiring to share the file with others). The secured channel may comprise an authenticated session between the first device and the computing device, and the secured channel may be generated after the first device has authenticated with the computing device.

In step 526, the computing device may send, to the first device, the unique token(s) and/or the session identifier(s) for the other devices. In some examples, the computing device may send, to the first device, the same tokens and session IDs that the computing device sent to each respective receiving device. In the above example assuming two potential receiving devices R1 and R2, the computing device may send the following information to the first device:

| Receiving Device | Token | Session |
|---|---|---|
| R1 | saa#@%@#asdfs12d | !s3sdf+190 %s!l2s$sf |
| R2 | Asdf2323@#$!@#%$ | 12A@#!@AW!@q |

If the computing device identified other potential receiving devices (e.g., in step 510), the computing device may similarly send their respective tokens and session identifiers to the first device. In step 528, the first device may receive, from the computing device, the unique token(s) and/or the session identifier(s) for the other devices. For example, the unique tokens and/or session identifiers for other devices may be securely shared with the first device via the authenticated secured channel between the first device and the computing device.

Figure 5C:
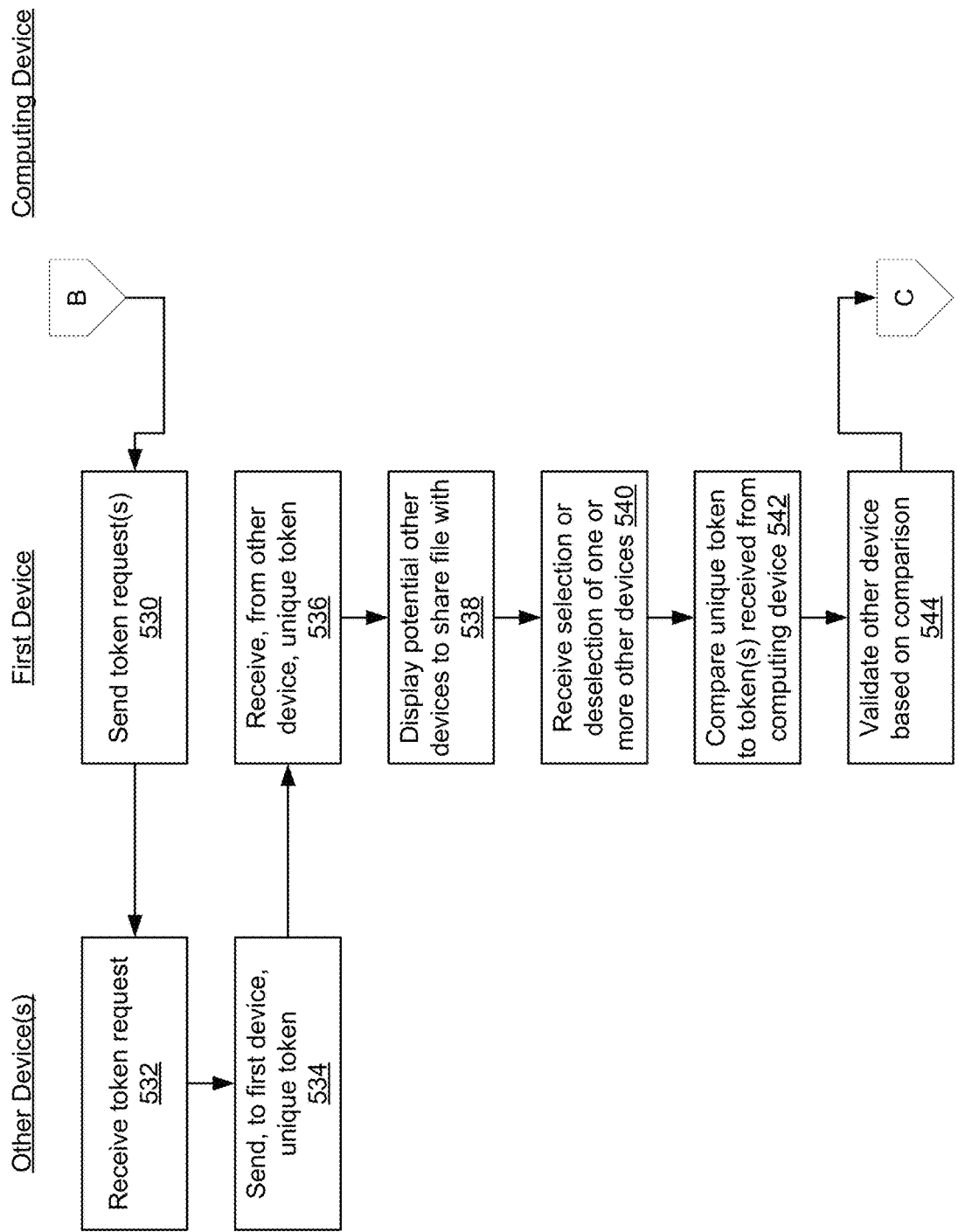

With reference to FIG. 5C, in step 530, the first device may send, to the other device(s), a request for the other devices' unique tokens. The first device may broadcast a token request to other devices within a particular distance from the first device (e.g., 50 meters, 30 meters, 10 meters, etc.). For example, the first device may send the token request using Wi-Fi Direct, Bluetooth, or other short or medium range wireless technologies. The first device may automatically broadcast the token request, which might not require user input. The devices that receive the first device's token request might be different from the devices identified by the computing device in step 510. For example, any device within range or proximity of the first device may receive the broadcast message. Additionally or alternatively, devices connected to the same network as the first device may receive the token request.

In step 532, other device(s) may receive, from the first device, the request for the device's unique token. For example, the receiving device R1 may receive a token request from the first device. Similarly, the receiving device R2 may receive a token request from the first device. In some examples, one or more of the receiving devices R1 or R2 might not receive the token request, such as if the device R1 or R2 is not within broadcast range of the first device and/or is not connected to the same network as the first device.

In step 534, the other device(s) may send, to the first device, its respective token. For example, receiving device R1 may send, to the first device, the token it previously received from the computing device (e.g., saa#@%@#asdfs12d) assuming R1 received the token request from the first device. Similarly, receiving device R2 may send, to the first device, the token it previously received from the computing device (e.g., Asdf2323 @#$!@#%$) assuming R2 received the token request from the first device. Other devices may similarly respond to the first device by sending their respective tokens. If a device that received the token request from the first device did not receive a token from the computing device (e.g., in step 522), the device may ignore the token request from the first device. In some examples, the other device(s) may automatically send their respective tokens (e.g., without user input). In other examples, the device may display a pop-up or other message requesting the user to acknowledge the user wants to receive a particular file. The user may acknowledge receiving the file via the device, and the device may send its token in step 534 in response to the acknowledgment.

In step 536, the first device may receive unique tokens from other devices. The first device may receive tokens via the same network that it used to broadcast the token requests, such as a Wi-Fi Direct connection, a Bluetooth connection, or other short or medium range wireless connection.

In step 538, the first device may display, to a user of the first device, a list of potential devices for which to share the file. The list of devices may comprise the devices for which the first device received tokens from. For example, the list of devices may comprise the receiving device R1, the receiving device R2, and/or other devices within proximity of the first device. The first device may display, such as via a pop-up or other window, the list of devices, along with, for example, check boxes for each device.

In step 540, the first device may receive, from the user, a selection or deselection of one or more of the devices for which to share the file. The user may select or de-select devices that are to receive the file. This may allow the user to remove any false positives added during the token request process and/or otherwise remove any device the user does not wish to share the file with. For example, the user may have desired to share the file with other devices in the same meeting room. However, a device in an adjacent meeting room may have sent its unique token to the first device, and the user may remove that device from the list of devices to provide the file to. Once the user is done selecting and/or deselecting devices, the user of the first device may select a share option displayed on the first device. In some examples, the user might not need to manually select or deselect devices, and the process may be automated. For example, devices within the same meeting room as the first device and/or within a threshold distance of the first device (e.g., within 10 feet of the first device) can be automatically selected by the first device.

In step 542, the first device may compare the token received from each other device (e.g., in step 536) to the token(s) received from the computing device (e.g., in step 528). For example, the first device may determine whether the tokens match or otherwise correspond to each other. In step 544, the first device may validate the other device(s) based on the comparison. In other words, the first device may be able to validate tokens received from nearby devices. If the token received from a particular device (e.g., receiving device R1) matches the corresponding token received from the computing device (e.g., token saa#@%@#asdfs12d for R1), the first device may validate that token. The first device may similarly validate tokens received from other devices. If the first device receives a token from another device, but did not receive a corresponding token from the computing device, the first device might not validate that device. The first device may reverse map the other user device (e.g., R1) based on the token and the mapping received from the computing device. As previously explained, tokens and/or session identifiers may be mapped to user devices. The first device may use the received token to identify the corresponding user device in the mapping between user devices and tokens and/or session identifiers.

Figure 5D:
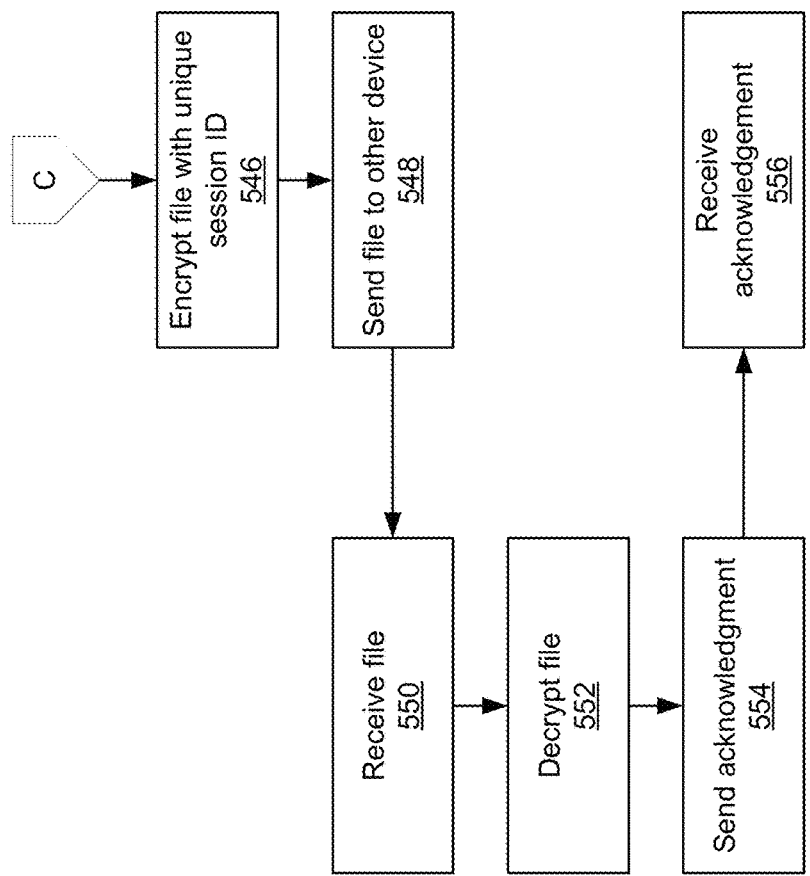

With reference to FIG. 5D, in step 546, the first device may encrypt the file to be shared with the other device, such as using the unique session identifier of the other device. For example, the first device may encrypt the file to be sent to the device R1 with the session identifier for device R1 (e.g., session ID !s3sdf#%s!12s$sf). As another example, the first device may encrypt the file to be sent to the device R2 with the session identifier for device R2 (e.g., session ID 12A@#!@AW!@q). Any encryption method may be used to encrypt the file, such as a symmetrical key algorithm or an asymmetrical key algorithm. As previously explained, the computing device may have provided each other device with its session identifier, which the other device may use to decrypt the encrypted file it receives from the first device. By using unique session identifiers to securely transfer files in a short-range ad-hoc network, the complexities of key exchanges through an unsecure medium between devices may be avoided. Moreover, the session identifiers may have been provided to the other devices via secured communication channels. Accordingly, data security may be improved based on techniques described herein.

In step 548, the first device may send the file to the other device. The file may be encrypted using the unique session identifier for the other device. The file may alternatively be encrypted via other techniques or might not be encrypted. The first device may send the file via the short range network(s) it used to communicate with the other device(s), such as a Bluetooth network or a Wi-Fi Direct network. As previously explained, the first device may also upload the file to the computing device (e.g., in parallel with sending the file to the other devices), which may allow remote devices to access the file and/or for the computing device to retain a copy of the shared file.

In step 550, the other device may receive the file from the first device. The file may be encrypted. In step 552, the other device may decrypt the received file. For example, the file may have been encrypted with the device's unique session identifier. The device may decrypt the file using its unique session identifier, which it may have previously received from the computing device.

In step 554, the other device may send an acknowledgment to the first device indicating that the other device received the file. In step 556, the first device may receive the acknowledgment from the other device. In some scenarios, the first device may display, to a user of the first device, an indication of the devices that successfully received the file.

Based on one or more aspects described above, enterprise solutions may be used, with the help of geo-location, to securely share files locally, such as using an ad-hoc network. This may reduce the effort of users to, for example, manually copy and paste each recipient's identifier (e.g., email address) from a meeting invitation. Moreover, in situations where the meeting invite was verbal (e.g., not through email), the need for the sender to ask or fetch individual user's email addresses may be removed.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a server and from a first user device, a request to share a file;
   determining, by the server, one or more user devices located within an area that includes a first location at which the first user device is located, the one or more user devices being different from the first user device;
   based on the receiving the request to share the file, generating, by the server, identification information for the one or more user devices on a per device basis, the identification information uniquely identifies individual devices of the one or more user devices from other devices within the area and the first user device;
   sending, by the server, different pieces of the identification information to the one or more user devices on a per device basis, so that the pieces of the identification information received by a given device of the one or more user devices is indicative of that device; and
   sending, by the server, the identification information to the first user device so as to enable the first user device to securely send the file to at least one of the one or more user devices.

2. The method of claim 1, wherein the determining the one or more user devices comprises determining the one or more user devices that are located within a threshold distance from the first user device.

3. The method of claim 1, further comprising:
receiving location information for the one or more user devices, wherein the determining the one or more user devices comprises:
  determining the first location of the first user device, the first location being a geographical location; and
  based on a comparison of the location information to the geographical location of the first user device, determining the one or more user devices that are located within the area that includes the geographical location.

4. The method of claim 1, wherein:
the identification information comprises a plurality of unique tokens and a plurality of unique session identifiers;
the generating the identification information comprises:
  generating the plurality of unique tokens, each unique token, of the plurality of unique tokens, corresponding to a different user device of the one or more user devices, and
  generating the plurality of unique session identifiers, each unique session identifier, of the plurality of unique session identifiers, corresponding to a different user device of the one or more user devices,
the sending the identification information comprises sending, to each user device of the plurality of one or more user devices, a respective unique token and a respective unique session identifier corresponding to each user device of the one or more user devices, and
the sending the identification information comprises sending, to the first user device, the plurality of unique tokens and the plurality of unique session identifiers.

5. The method of claim 1, further comprising:
receiving, by the server and from the first user device, the file to be shared;
storing, by the server, the file to be shared; and
sending, by the server and to a second user device at a second location that is remote from the first location at which the first user device is located, the stored file.

6. The method of claim 1, further comprising:
receiving, by the server and from a second user device at a geographical location different from the first location, a request for the file; and
sending, by the server and to the second user device, the file.

7. The method of claim 1, further comprising:
before the sending the different pieces of the identification information to the one or more user devices, authenticating, by the server, the one or more user devices; and
based on the authenticating, generating, for the one or more user devices, a secured channel between the server and the first user device, wherein the sending the identification information to the first user device comprises sending, to the first user device and via the secured channel between the server and the first user device, the identification information.

8. A method comprising:
sending, by a first user device and to a server, a request to share a file;
based on the sending the request to share the file, receiving, by the first user device and from the server, first identification information uniquely identifying individual devices of one or more user devices that are different from the first user device;
sending, by the first user device and to the one or more user devices located in proximity of the first user device, identification information requests;
based on the sending the identification information requests, receiving, by the first user device and from the one or more user devices in proximity of the first user device, second identification information; and
based on receiving the second identification information, sending, by the first user device and to the one or more user devices in proximity of the first user device, the file.

9. The method of claim 8, further comprising:
comparing, by the first user device, the second identification information received from the one or more user devices to the first identification information received from the server; and
based on the comparing, validating, by the first user device, the one or more user devices in proximity of the first user device,
wherein the sending the file is further based on the validating.

10. The method of claim 8, wherein the sending the identification information requests comprises sending the identification information requests via direct connections between the first user device and the one or more user devices in proximity of the first user device.

11. The method of claim 10, wherein the direct connections comprise one or more of a Bluetooth connection or a Wi-Fi Direct connection.

12. The method of claim 8, wherein the sending the identification information requests comprises broadcasting the identification information requests via one or more short-range networks.

13. The method of claim 8, wherein the receiving the second identification information comprises receiving the second identification information via one or more short-range networks.

14. The method of claim 8, wherein the first identification information comprises a plurality of unique tokens and a plurality of unique session identifiers, and
wherein the receiving the first identification information comprises receiving, by the first user device, from the server, and via a secured channel between the server and the first user device, the plurality of unique tokens and the plurality of unique session identifiers, each unique token corresponding to a different user device of the one or more user devices and each unique session identifier corresponding to a different user device of the one or more user devices.

15. The method of claim 14, further comprising:
encrypting, for each user device of the one or more user devices in proximity of the first user device, the file with a unique session identifier corresponding to the each user device,
wherein the sending the file comprises sending, for the each user device of the one or more user devices in proximity of the first user device, the file encrypted with the unique session identifier corresponding to the each user device.

16. The method of claim 8, further comprising:
based on a determination to share the file with the one or more user devices, sending, by the first user device and to the server, the file.

17. An apparatus comprising:
one or more processors; and
memory storing instructions that, when executed by the one or more processors, cause the apparatus to:
  receive, from a first user device, a request to share a file;

determine one or more user devices located within an area that includes a first location at which the first user device is located, the one or more user devices being different from the first user device;

based on the receiving the request to share the file, generate identification information for the one or more user devices on a per device basis, the identification information uniquely identifies individual devices of the one or more user devices from other devices within the area and the first user device;

send different pieces of the identification information to the one or more user devices on a per device basis, so that the pieces of the identification information received by a give device of the one or more user devices is indicative of that device; and send the identification information to the first user device so as to enable the first user device to securely send the file to at least one of the one or more user devices.

18. The apparatus of claim 17, wherein the instructions, when executed by the one or more processors, further cause the apparatus to:

receive location information for the one or more user devices, and wherein the instructions, when executed by the one or more processors, cause the apparatus to determine the one or more user devices by:

determining the first location of the first user device, the first location being a geographical location; and based on a comparison of the location information to the geographical location of the first user device, determining the one or more user devices that are located within the area that includes the geographical location.

19. The apparatus of claim 17, wherein:

the identification information comprises a plurality of unique tokens and a plurality of unique session identifiers;

the instructions, when executed by the one or more processors, cause the apparatus to generate the identification information by:

generating the plurality of unique tokens, each unique token, of the plurality of unique tokens, corresponding to a different user device of the one or more user devices, generating the plurality of unique session identifiers, each unique session identifier of the plurality of unique session identifiers corresponding to a different user device of the one or more user devices, the instructions, when executed by the one or more processors, cause the apparatus to send the identification information by sending, to each user device of the one or more user devices, a respective unique token and a respective unique session identifier corresponding to each user device of the one or more user devices, and the instructions, when executed by the one or more processors, cause the apparatus to send the identification information by sending, to the first user device, the plurality of unique tokens and the plurality of unique session identifiers.

20. The apparatus of claim 17, wherein the instructions, when executed by the one or more processors, further cause the apparatus to:

receive, from the first user device, the file to be shared;

store the file to be shared; and send, to a second user device at a second location that is remote from the first location at which the first user device is located, the stored file.

\* \* \* \* \*